United States Patent [19]

Martin

[11] Patent Number: 5,042,606

[45] Date of Patent: Aug. 27, 1991

[54] SNOWMOBILE SKI LOCATOR

[76] Inventor: Philip T. Martin, 36 West Rd., Circle Pines, Minn. 55014

[21] Appl. No.: 484,853

[22] Filed: Feb. 26, 1990

[51] Int. Cl.$^5$ ............................................. B60R 1/10
[52] U.S. Cl. .................... 180/182; 280/28; 280/727; 280/762; 362/61; 359/515
[58] Field of Search ................ 180/182, 186; 280/28, 280/727, 762; 362/61; 350/97, 98, 100

[56] References Cited

U.S. PATENT DOCUMENTS

| | | | |
|---|---|---|---|
| 1,528,562 | 3/1925 | Parkhurst | 350/100 |
| 2,075,900 | 4/1937 | Jackson | 362/61 |
| 2,210,807 | 8/1940 | Fitzgerald | 362/61 |
| 4,646,208 | 2/1987 | Hayashi et al. | 280/727 |
| 4,714,125 | 12/1987 | Stacy, Jr. | 180/182 |

FOREIGN PATENT DOCUMENTS

| | | | |
|---|---|---|---|
| 449779 | 9/1927 | Fed. Rep. of Germany | 280/762 |
| 358952 | 1/1906 | France | 362/61 |
| 85962 | 7/1920 | Switzerland | 362/61 |

Primary Examiner—Mitchell J. Hill
Attorney, Agent, or Firm—John W. Adams

[57] ABSTRACT

This is a device for locating the ski tips of a snowmobile by reflecting the beam of light from the headlight of the snowmobile back to the operator by a reflection material applied to the ski locator device and adjusting the locator to provide maximum reflection back to the operator.

4 Claims, 1 Drawing Sheet

SNOWMOBILE SKI LOCATOR

BACKGROUND OF THE INVENTION

As snowmobiles continue to increase in speed and performance, the need for better safety measures increase as well. The problem many snowmobilers have in operating their machines is the positioning of their skis. The skis are frequently hidden from the operator's view which increases the problems incurred in negotiating turns, staying on trails and avoiding obstacles on trails such as logs, stumps, rocks, branches, etc., which could cause damage to exposed suspension components. The present invention is designed to eliminate this problem in an inexpensive and easy way by providing a locator for ski tips which can be readily seen by the operator.

SUMMARY OF THE INVENTION

The present invention embodies a pair of ski tip locators mounted on the handles of the snowmobile skis. The upper backing of the locator is provided with a reflective means to indicate the positioning of the skis to the operator even during night time operation. The locators are clamped onto the handles so that they may be adjusted to provide for maximum reflection of the headlight beam back to the operator.

DETAILED DESCRIPTION OF THE DRAWINGS

Figure 1:
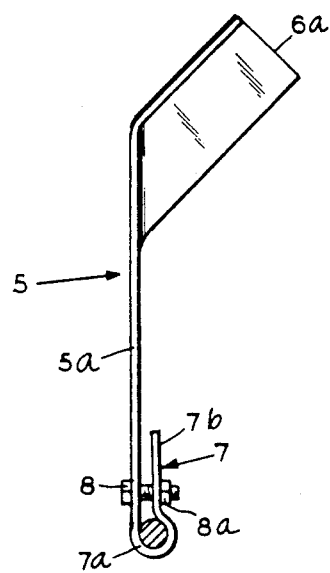
Figure 2:
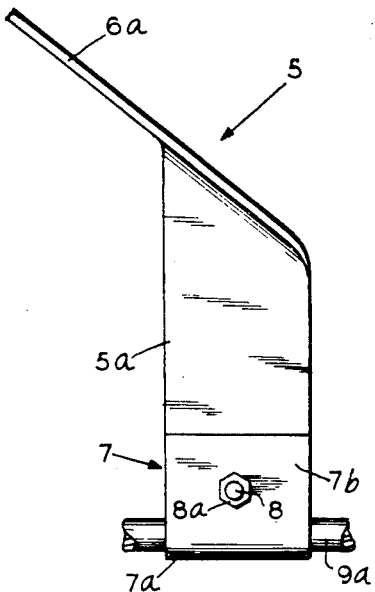
Figure 3:
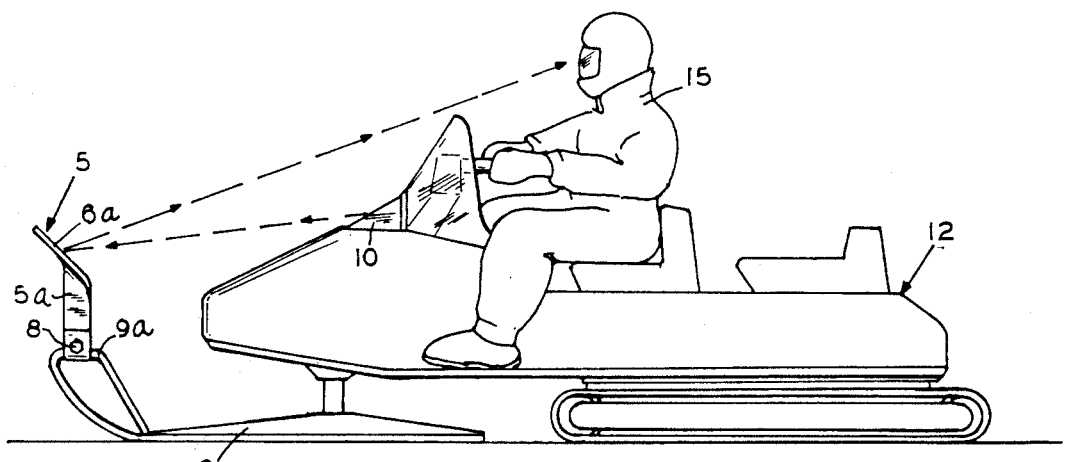

FIG. 1 is a front plan view of the ski tip locator;
FIG. 2 is a side view of the ski tip locator; and
FIG. 3 is a side view of the ski tip locator mounted on a conventional snowmobile.

DETAILED DESCRIPTION OF THE PREFERRED EMBODIMENT

FIG. 1 shows a front view of the ski tip locator units 5. In the form shown, the locator is made from an integal piece of sheet metal bent at the bottom to form a mounting clamp 7 and at the top (shown in FIG. 2) to provide a reflective backing element in which a reflective material is applied.

The backing 6a is bent inwardly and at an incline from the main body portion 5a of the ski locator 5. The inward bend provides for increase light intensity reflecting back from the headlight 10 to reflect a high intensity of the light back to the operator 15 of the snowmobile 12. Also, the inward position prevents the locator from being sideswiped and thus knocked out of position and for safety measures. The backing 6a is bent at an angle to provide for optimum reflectivity back to the operator 15.

The reflective material may be applied to the backing 6 in a number of ways such as spraying or painting or laminating. The material should be durable to withstand cold weather and chipping.

The clamping portion of the ski locator 5 is doubled back on itself to provide a handle engaging loop 7a at the bottom with a lead 7b coming back parallel to the main body portion 5a of the locator 5. The clamping means consists of a nut 8a and bolt 8 which goes through holes which are drilled in the main body portion 5a and the lead 7b.

The ski tip locator 5 is clamped to the handles 9a of the snowmobile skis 9. The handles 9a lie in the vertical longitudinal center line plane of each ski 9. The advantage of this clamping means is that it is adjustable to permit an optimum adjustment for maximum reflection of light back to the operator 15 of the snowmobile 12.

It will of course be understood that various changes may be made in the details, form, arrangement and proportion of the parts herein described without departing from the scope of the invention which is set forth in the claims.

What is claimed is:

1. A device for locating ski tips on a snowmobile having headlights, front skis with handles extending up from the forward ends thereof, said device comprising;
   a pair of reflective ski locator units each having;
   a mounting clamp for attachment to the handles of the snowmobile skis,
   an upstanding support extending from the clamp,
   a reflector backing element attached to the support,
   a reflecting surface on the reflective backing element to reflect the light radiating from the headlight back to the operator,
   and means for adjusting each unit to reflect the light back at the optimum angle to the operator.

2. The structure set forth in claim 1 and reflective material applied to said reflective backing element.

3. The structure set forth in claim 1 wherein each clamp includes a bend in each unit to form an integral mounting clamp.

4. The structure set forth in claim 3 wherein each clamp is adjustable on the ski handle to position each unit for optimum reflectivity.

* * * * *